March 5, 1929.  C. W. LARNER  1,704,392
FLOW CONTROL SYSTEM
Filed March 9, 1920  2 Sheets-Sheet 1

Fig. 1.

Inventor
Chester W. Larner
by his Attorneys
Edwards, Sager & Bauer

Patented Mar. 5, 1929.

1,704,392

UNITED STATES PATENT OFFICE.

CHESTER W. LARNER, OF PHILADELPHIA, PENNSYLVANIA, ASSIGNOR, BY MESNE ASSIGNMENTS, TO I. P. MORRIS CORPORATION, A CORPORATION OF DELAWARE.

FLOW-CONTROL SYSTEM.

Application filed March 9, 1920. Serial No. 364,541.

This invention relates to systems for controlling the flow of a fluid and particularly to the regulation of the opening and closing of a fluid controlling valve. The chief object of the invention is to provide such a system in which the operation and rate of movement of the valve will be automatically regulated so as to be as rapid as may be desirable and yet to avoid water hammer or sudden and violent changes of velocity.

Where the flow of water controlled is great in quantity or head as in a water power plant, the operation of the control valves is attended with constant danger of a too rapid or too slow valve movement either in opening or in closing. If the valve movement is too rapid in closing it will suddenly decelerate the flow and cause a dangerous rise in pressure; if too slow it may permit destructive outflow long after it could have been safely shut off. Similarly in the opening of the valve a too rapid movement will often permit a precipitous and harmful rush of current while a too slow opening means wasted time.

Under ordinary operating conditions it may be possible for a skilled and experienced operator to approximate the desired valve movement to a greater or less degree but it is hazardous to thus make the safety of a plant or pipe line dependent on whether an operator knows enough or is skillful enough to correctly control the valve movement. And in case of an accident the operator is excited and has no precedent to guide him and it is often impossible at the moment to determine the proper valve movement. For instance in a turbine power plant the turbine gates may be caught open and the control valve may then have to close across the flowing stream. In this case care must be taken in closing to prevent dangerous water hammer, which would result from too rapid closing of the valve. The pressure rise in the pipe is closely related to the closing characteristics of the valve. Ordinarily, in a pipe line under pressure the maximum normal velocity is only a small fraction of the velocity which could be produced by the pressure if the water were free to discharge into the atmosphere. For example:—In a water power plant under 200 feet head the maximum velocity of the water entering the turbine where the valve is located would probably be about 15 feet per second, whereas, the spouting velocity under 200 feet head is about 115 feet per second. Consequently, if the turbine gates were stuck wide open with the velocity in the pipe 15 feet per second and it were necessary to close the valve, the plunger would move about $1-15/115=20/23$ of its full travel before it would begin to reduce the velocity in the pipe materially. Up to that point it would merely accelerate the velocity through the valve opening. When, however, the velocity through the valve has reached the maximum which can be produced by 200 feet head then the valve begins to cut down the flow through the pipe.

It is hence obvious that up to the point where the velocity in the pipe begins to be reduced the rate of closing the valve may be rapid, but from that point on the valve must close slowly or water hammer will result. It is also obvious that the point at which the change of rate should occur depends upon the initial pipe line velocity, or, in other words, upon the amount the turbine gates are open. Consequently, it is clear that the means adopted for slowing down the closing of the valve toward the end of the stroke should be responsive to the increase of velocity through the valve opening.

Also in the case of a break in the pipe between the valve and the turbine or in the turbine casing, such a break may, depending upon its magnitude, increase the velocity in the pipe any amount up to full spouting velocity, and hence the slow closing characteristic of the valve may be required to take effect at any point of the stroke from wide open toward fully closed. It is therefore again obvious that this characteristic should be initiated by the velocity through the valve opening.

Similarly with the turbine gates closed and the casing and pipe between the valve and the turbine empty or only partially filled, if the valve is opened rapidly the water will rush into the empty casing and when the casing is filled the velocity in the pipe line must be suddenly checked, resulting in water hammer and if the pipe line is of any considerable length serious water hammer may result. This is particularly true if there is much length of pipe between the valve and the casing. The greater the empty space to be filled the higher the velocity in the pipe will become before the space is filled, and the higher the velocity becomes the greater the water hammer will be when it is checked. It is hence obvious that the valve should open only a slight amount at first and should then stop until the turbine casing is filled or primed and should then resume and complete the opening stroke. The remainder of the stroke may be made rapidly. The means for resuming the stroke after priming should be responsive to the establishment of normal pressure in the turbine casing.

It is apparent from the foregoing that the most essential operating characteristics of a valve for use in a closed conduit are slow or damped motion at the end of the closing stroke and arrested motion at the beginning of the opening stroke for priming. Except for these provisions, both opening and closing may be rapid and should, in fact, be rapid because otherwise, in case of a broken pipe or other accident to the system, much damage might result before the valve could be closed. The correct rates of the slow and rapid movements and the relative proportion of each depending on the characteristics of the system and the conditions of each particular emergency, are widely variable and often cannot be approached even by the most skillful operator and in most cases the actual conditions to be met are hidden from view and cannot be predetermined.

In the system of this invention the proper control and timing of the movements of the valve are automatically provided for and automatically governed throughout the entire stroke of the valve both in opening and in closing. While in the following description and accompanying drawings the invention is disclosed in connection with a specific embodiment thereof it is understood that modifications may be resorted to within the principles of the invention and the scope of the appended claims.

In the accompanying drawings

In the specific embodiment of the invention disclosed in the drawings a valve body 1 contains an internal cylinder 2 opened at one end and closed at the other and held in spaced relation to the body 1 by radial ribs 3. The space between body 1 and the cylinder 2 forms a waterway or passage 7 through the valve which is opened and closed by a plunger 4 sliding in cylinder 2 and controlling the flow to the volute turbine casing 39. The plunger 4 is shaped so as to form inside of cylinder 2 a cylindrical chamber 5 and an annular chamber 6. Plunger 4 is closed by admitting pressure from waterway 7 to chamber 5 and exhausting pressure from chamber 6 to the atmosphere or some other region of lower pressure. Plunger 4 is opened by reversing this process.

If such valves are to be operated in still water a four-way cock or four ported slide valve may be used to supply and exhaust water to or from chambers 5 and 6 but they are undesirable for operation in flowing water because except in the hands of a skilled operator they cannot be made to perform satisfactorily the special characteristics already described upon which the safe operation of valves under such conditions depends. Independent devices, must be used for admitting and discharging pressure from both chambers, in order that independent adjustment of supply and discharge may be secured.

Figure 1:
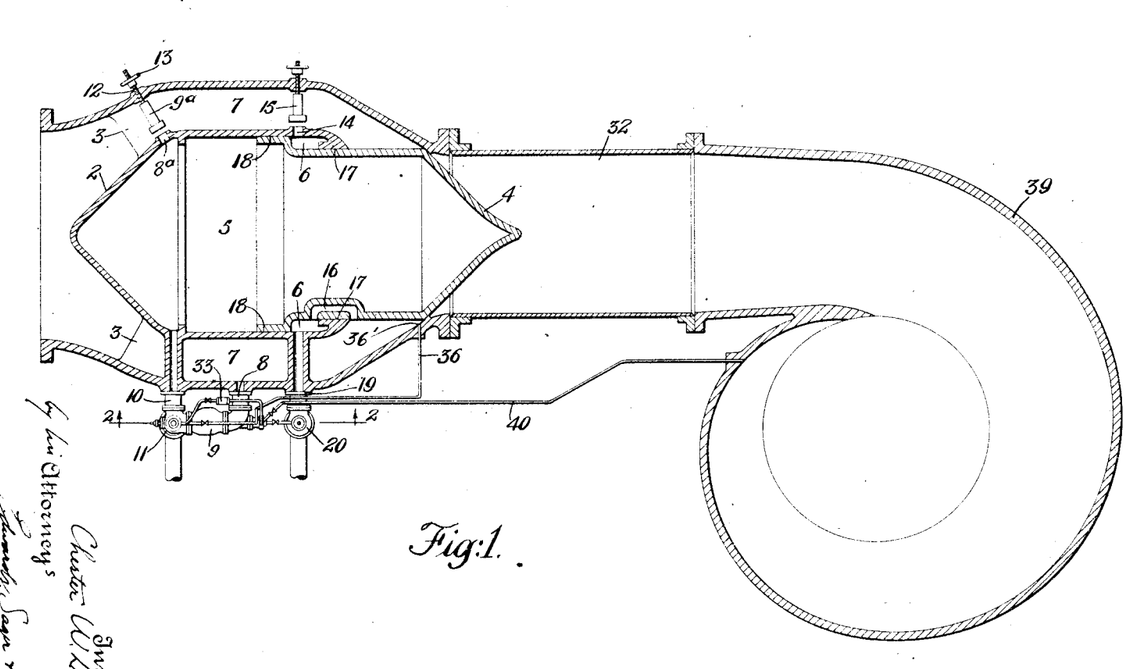
Fig. 1 is a diagrammatic view in horizontal section of a hydraulic turbine power system illustrating a specific application of the system of this invention.

The operation of the valve Figure 1 requires the following:—
(a) Admission of pressure to chamber 5.
(b) Exhaust of pressure from chamber 5.
(c) Admission of pressure to chamber 6.
(d) Exhaust of pressure from chamber 6.

Considering separately the various means for performing these operations:—

(a) Pressure to close the valve may be admitted from waterway 7 to chamber 5 in any one of the following ways:—
(1) Through pipes 8 and 10, valve 11 being closed and valve 9 used to regulate the flow.
(2) Through port 8$^a$, valve 9$^a$ being used to regulate the flow.
(3) Through port 8$^a$, valve 9$^a$ being omitted, and no means being provided for regulating the flow.

It is obvious that, since pressure must be supplied to chamber 5 to close the valve, the speed of closing depends upon the rate at which water is supplied to chamber 5. If the supply is throttled by valve 9 or 9$^a$ the speed of plunger 4 will be reduced. Such throttling does not, however, have a constant effect as may be illustrated in the following way:—

Suppose, for example, that chamber 6 is one fourth the cross-sectional area of chamber 5 and the pressure in waterway 7 is 100 pounds per square inch. Chamber 6 is exhausted to atmosphere to close the valve and the pressure in chamber 5 falls to 75 pounds plus whatever small force is necessary to move the plunger. Consequently the pressure producing flow through valve 9 or port 8$^a$ is a little less than 25 pounds and the plunger 4 will close as fast as the water necessary to fill chamber 5 can be supplied under a pressure of about 25 pounds.

As plunger 4 approaches its seat, however, the velocity through the valve opening increases and the pressure on the nose of the plunger decreases until finally the velocity reaches the spouting value and the pressure is reduced to zero. At this point the velocity in the pipe line leading to the valve begins to be checked and this is the point where the closing speed of the valve begins to be a vital matter. From this point on the valve should close slowly. The loss of pressure on the nose of the plunger, however, makes it close faster. The pressure in chamber 5 drops to almost 0 and the pressure producing flow into chamber 5 through valve 9 or port 8ᵃ is now nearly 100 pounds or four times what it was. This produces double the flow and consequently the valve instead of closing slowly moves twice as fast. It is plain therefore, that in order to secure damped motion toward the end of the closing stroke throttling of the supply to chamber 5 should increase toward the end of the closing stroke and should be responsive to increase of velocity through the valve opening. Such a valve, suitable for use at valve 9 is shown, Figure 2, and will be described later. Valve 9ᵃ has the desired characteristic also. It is held open normally by water pressure on the area of the exposed stem 12. Hand wheel 13 may be adjusted to permit valve 9ᵃ to close at 8ᵃ to any desired extent and 9ᵃ will so close as the result of pressure drop in chamber 5 resulting from increase of velocity through the valve opening.

(b) Pressure is exhausted to open the valve from chamber 5 through pipe 10 and valve 11 with valve 9 closed. It is therefore necessary that valve 9 should close automatically whenever valve 11 opens.

If valve 9ᵃ is used it will close automatically to whatever point the setting of hand wheel 13 permits and the small quantity of water it passes will not interfere materially with the exhaust of pressure from chamber 5 through valve 11. If only an open hole 8ᵃ is used, however, valve 11 must be large enough to open plunger 4 and at the same time discharge the water leaking from chamber 6 to chamber 5 through the clearance around plunger 4 and also the water entering through port 8ᵃ.

In order to unseat plunger 4 with atmospheric pressure on the nose it is necessary (in the example previously cited) to reduce the pressure in chamber 5 below 25 pounds. As soon as the plunger opens slightly pressure begins to accumulate on the nose of plunger 4, increasing the pressure in chamber 5 and hence the discharge through valve 11 and plunger 4 moves open more rapidly. To open the plunger slightly and hold it there for priming it is necessary to close valve 11 as soon as plunger 4 has opened the desired amount.

It is obvious, therefore, that in order to secure the priming feature valve 11 must close responsive to high velocity through the valve opening and must subsequently open automatically when the system beyond the valve is filled and the velocity through the valve opening has been reduced to a normal value. The rate at which the plunger 4 continues and completes its opening stroke depends upon the area of discharge through valve 11 when open.

Figure 2:
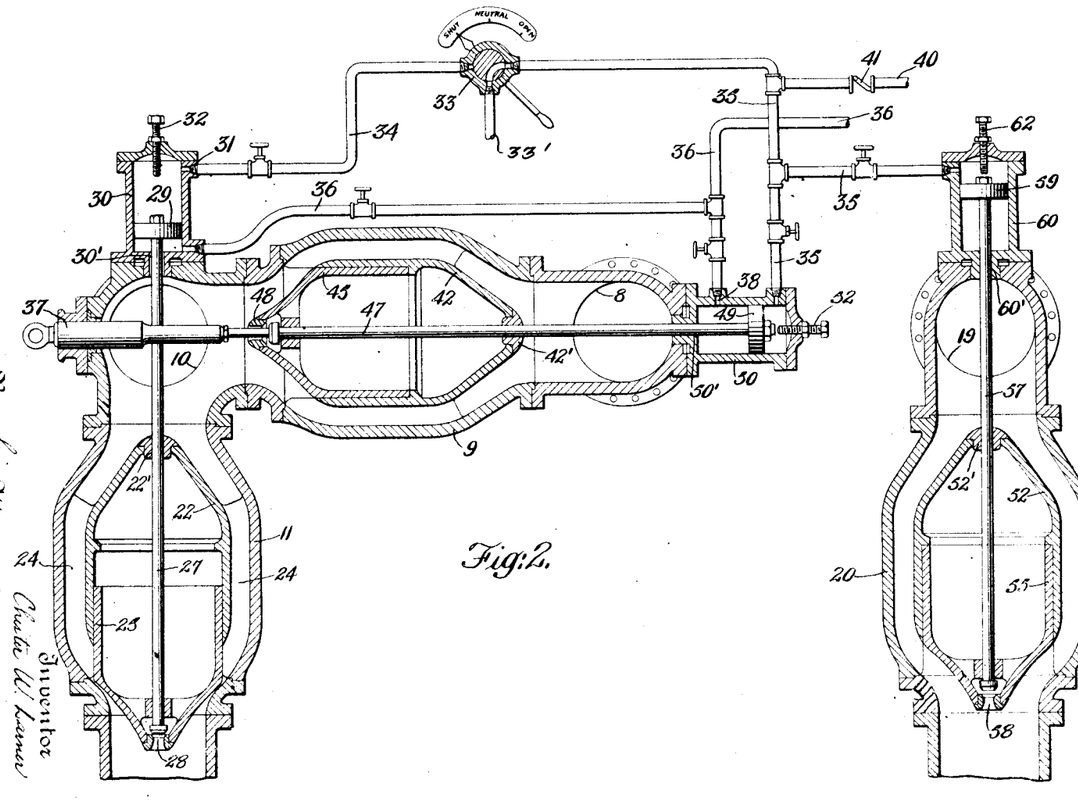
Fig. 2 is a diagrammatic view in vertical section of apparatus illustrating one specific embodiment of this invention in controlling means of the power system disclosed in Fig. 1, and is taken on line 2, 2 of Fig. 1.

A valve of the desired characterstics for use at valve 11 is shown, Figure 2, and described later.

(c) Pressure to open the valve may be admitted from waterway 7 to chamber 6 in any one of the following ways:—

(1) Through port 14, valve 15 being used to regulate the flow.

(2) Through port 14, valve 15 being omitted and no means being provided for regulating the flow.

(3) Through a port or by-pass 16 in plunger 4, port 16 being so placed as to admit pressure to chamber 6 at the beginning of the opening stroke of plunger 4. After the plunger moves a short distance admitting pressure to the system beyond the valve, port 16 is cut off from waterway 7 and thereafter pressure is admitted to chamber 6 through the clearance space 17 between plunger 4 and cylinder 2.

(4) Through the clearance space 17.

It is obvious that if the valve has the same pressure on both sides, a comparatively small reduction of pressure in chamber 5 will open plunger 4 and water will be supplied to chamber 6 through clearance 17 if no other means is provided. If, however, the system beyond the valve is not under pressure, the pressure in chamber 5 must be very much reduced before plunger 4 will open. In the example previously cited the pressure in chamber 5 must be reduced below 25 pounds even if the pressure in chamber 6 is maintained at the full 100 pounds. If chamber 6 is supplied by leakage at clearance space 17 it is obvious that pressure in chambers cannot be maintained at 100 pounds. In fact, it will fall considerably below because as it leaks in at clearance space 17 it leaks out at clearance 18 and hence the pressure in chamber 6 will probably be about a mean between 100 pounds and 25 pounds. This drop in chamber 6 necessitates a corresponding drop in chamber 5 before the plunger will open and since it is impossible to drop the pressure in chamber 5 to atmosphere and still get any discharge through pipe 10 and valve 11, the condition may result where it is impossible to drop the pressure in chamber 5 enough to open the valve.

This condition can be corrected by using the port 14, but unless it is regulated by a valve such as valve 15 which will close to prevent water flowing into chamber 6 when chamber 6 is being exhausted to close the plunger, the water thus admitted will necessitate making pipe 19 and valve 20 considerably larger than would otherwise be necessary.

If clearance 17 is made relatively larger than clearance 18 the result is equivalent to the use of port 14 without valve 15 and is open to the same objections.

Port 16 may be utilized to supply pressure to chamber 6 for starting the opening movement of the plunger. It is cut off as soon as the plunger has opened slightly but after that has taken place the system beyond the valve fills and builds up pressure on the nose of the plunger and it is then no longer necessary to maintain full pressure in chamber 6 in order that the plunger shall continue the opening movement. A slight difference of pressure between chamber 5 and chamber 6 will suffice and there is hence no objection to port 16 being cut off and this is a decided advantage when closing the valve, because no pressure enters chamber 6 through port 16 until just before plunger 4 seats and at that point the pressure on the nose of the plunger is lost and the closing movement will continue even though pressure in chamber 6 is raised due to influx through port 16. The area of port 16, however, should preferably be considerably less than the area of pipe 19 to prevent undue rise of pressure in chamber 6.

(d) To close the valve pressure may be exhausted from chamber 6 through pipe 19 controlled by valve 20. Pipe 19 should preferably discharge to atmospheric pressure throughout the closing movement of the valve. The rate of closing may be controlled by throttling with valve 20 but it is preferable to control it by throttling the inflow to chamber 5 through valve 9. If valve 20 is throttled a dangerous pressure may be set up in chamber 6 just before plunger 4 closes due to loss of pressure on the plunger nose unless, of course, port 14 or port 16 is used, in which case control of the stroke is lost just before plunger 4 closes due to escape of pressure through port 14 or port 16 and it is at this point that it is particularly important for the plunger to move slowly.

Having described separately the various methods of admitting and discharging pressure to and from chambers 5 and 6 and the relative merits of each, it will be obvious to those skilled in the art that various combinations of these four elements may be made to obtain different operating characteristics of the valve. Simplicity of control mechanism is desirable and it should be made no more complicated than the required operating characteristics of the valve demand.

If the valve is to operate in dead water the control mechanism may be quite simple. Ports $8^a$ and 14 without valves $9^a$ and 15 may be used for admitting pressure to chambers 5 and 6 and valves 11 and 20 may be used for exhausting, pipe 8 and valve 9 being omitted. The exhaust passages must, of course, be made much larger than the inlet ports. This arrangement will give satisfactory operation in still water but is not satisfactory when flow occurs, because the time of opening and closing cannot be properly controlled.

In the control system of this invention, as illustrated in the drawings, the movement of plunger 4, in addition to the control by the operator, is automatically regulated by instantaneous conditions of flow to have the correct damping on closing and arrested opening. Referring to Fig. 2, the operator has a three-way control valve 33 conveniently positioned in the plant and connected to selectively exhaust either pipe 34 or 35 through outlet 33' or to rest in intermediate position with both pipes 34 and 35 closed. To open the plunger 4 the control valve 33 is moved to close pipe 35 and exhaust pipe 34 which is connected at 31 to the upper end of regulating cylinder 30 for the valve 11 controlling the outflow through pipe 10. Exhaust of pressure from the top of this cylinder 30 causes the piston 29 of the regulating rod 27 to raise said rod by pressure on the under surface of the piston leaking in around the loose fit of the rod in the cylinder head at 30'. The lifting of this rod 27 opens the outlet 28 and exhaust pressure from within the valve 25 and cylinder 22 faster than pressure will be supplied through the loose fit between the rod and the cylinders 22 at 22' so that pressure in the waterway 24 will lift the valve 25 and exhaust the fluid through pipe 10 from the interior of main valve 4 and cylinder 5.

When pipe 34 is exhausting through valve 33 this valve will hold closed the end of pipe 35 connected to the head ends of regulating cylinders 50 and 60 of valves 9 and 20 respectively. Therefore pressure seeping in from pipe 8 through the loose fit at 50' and the loose fit of the piston 49 in the cylinder 50 will be applied to both faces of the piston 49 so that in regulating rod 47 of valve 9 will be pressed to the left by the internal fluid pressure on the end of the enlargement 37 the outer end of which is exposed to the atmosphere. This movement of the rod 47 to the left will close outlet 48 and permit pressure to develop in the valve 45 and cylinder 42 by leakage at 42' holding the valve 45 closed and thus closing pipe 8.

Similarly with valve 20, pressure from pipe 19 will leak through loose fit 60' and around regulating piston 59 permitting rod 57 to drop since the pressure at its lower end is substantially atmospheric. This closes outlet 58 and by leakage through loose fit 52' fills cylinder 52 and valve 55 with fluid pressure and closes said valve to close pipe 19.

With the pipes 8 and 19 thus held closed pressure will be maintained in space 6 and the valve 4 will open according as fluid is exhausted through pipe 10. The opening of the valve may therefore be regulated by the outflow through pipe 10 controlled by valve 11 comprising the plunger valve proper 25. To govern the opening of this valve 11 a passage 36 is provided connecting the lower end of regulating cylinder 30 with the neck of the main valve 4 at 36'. If the space beyond valve 4 is empty then as soon as this valve opens slightly a spouting velocity will occur at the point 36' dropping the pressure in passage 36 and lowering the pressure under piston 29 to drop the lower end of rod 27 into outlet 28 and close valve plunger 25 by pressure through clearance 22', thus shutting off pipe 10 and holding main valve 4 balanced in only slightly open position. This main valve will remain substantially in this position until piping 32 and turbine casing 39 are filled sufficiently to restore the pressure at the point 36'. This restored pressure will then be communicated to the space underneath piston 29 which will be lifted to raise valve plunger 25 from its seat opening the exhaust through pipe 11 and permitting the main plunger valve 4 to complete its opening stroke at a rapid rate. The adjustable screw bolt 32' in the head of the cylinder 30 variably limits the upward movement of the rod 27 and thus adjusts the size of the passage through valve 11 when open.

The too rapid filling of empty spaces beyond the valve will therefore be automatically prevented but if on the opening of main valve 4 the conduit spaces 32 are filled with water this danger is minimized, and no spouting velocity will occur to drop the pressure in the passage 36 and close valve 25 which then will be permitted to open without arrested movement and at the most rapid rate consistent with the velocity or pressure through the valve neck at 36'. It is therefore evident that under all conditions the main valve 4 will open automatically at the most rapid rate permissible under the instantaneous flow characteristics. The operator does not have to be skillful nor give his close attention to prolonged and delicate adjustments of the valves but simply turns the three way valve 33 to the "open" position.

The closing of the main valve is similarly a simple and automatically regulated operation. With the three way valve 33 in the "close" position pipe 34 will be closed and pipe 35 opened to the exhaust. The closing of pipe 34 closes the exhausts of pressure above piston 29 and this piston will therefore remain in its lowermost position since its lower end is at atmospheric pressure, and plunger 25 and valve 11 will remain closed. The exhausting of pipe 35 reduces the pressure above regulating piston 59 so that pressure underneath said piston passing in through clearance 60' will raise the rod 57 to open outlet 58 and plunger 55 of valve 20, thus exhausting pipe 19 and reducing the pressure in the space 6 around plunger valve 4. Pipe 35 also exhausts pressure from the head end of cylinder 50 so that pressure on the other side of the piston 49 will move rod 47 to the right (Fig. 2) and open plunger 45 of valve 9 to admit pressure from water passage 7 through pipes 8 and 10 to the interior of cylinder 5. The rate of closing of the plunger valve 4 may be controlled by the regulation of its flow and to accomplish this passage 36 is connected into the cylinder 50 near the left end at port 38 which is positioned so that the piston 49 will close this port in the closed position of plunger 45. This connection of pipe 36 therefore will be shut off when valve 9 is closed for instance during the opening of valve 4.

As valve 4 closes from its extreme open position its movement has little effect upon the pressure at 36' until the passage through the neck of the valve becomes restricted enough to increase the velocity therethrough. With this increase in velocity there will occur a corresponding decrease in the pressure at 36' and in passage 36 which when communicated to regulating cylinder 50 at point 38 will reduce the pressure to the left of piston 49 moving rod 47 to the left and restricting outlet 48 to move plunger 45 toward the left and restrict the passage through valve 9 so that the closing movement of the plunger will be slowed down. The closer the valve 4 approaches its seat the greater will be the velocity at point 36' and the greater will be the restriction of valve 9 and the retarding effect of the regulation so that the plunger 4 at the end of its closing stroke will gradually and gently seat with a gradual and gentle deceleration of the flow and without any sudden or excessive rise in pressure. The first portion of the closing stroke will therefore be very rapid and the end very slow and this end damping will begin to take effect as soon as the velocity through the valve opening becomes high regardless of the position of the plunger 4. Thus if a bad break has occurred at the turbine casing, the damping effect will begin earlier in the closing stroke than would be the case if the valve were closing with the turbine gates only slightly open because the volume of water passing through the valve in the former case would be much greater.

With the valve control system of this invention, therefore, a fluid control is automatically regulated in safe and efficient manner to avoid delay and at the same time to avoid undue rise in pressure and great rushes of flow. The operator has simply to move a single valve to the desired position and the control system is such that all the consequent movements of the parts will be automatically governed by the instantaneous condition of the flow in the system. At the same time the control is such that the operator may interrupt the opening or closing movement at any point and stop or reverse it without impairing the automatic regulation which will continue at all times. It is also possible with this system to automatically initiate the closing movement of the valve without the presence of the operator and for this purpose a pipe 40 may be connected from the pipe 35 to any desired point such as the turbine casing 39 wherein a sudden drop in pressure would indicate an abnormal and dangerous breakage and outflow. The resultant drop in pressure communicated to the pipe 35 through pipe 40 will have the same effect as turning valve 33 to the "close" position and will close the main valve plunger 4 as rapidly as permissible under the circumstances. A check valve 41 is provided to prevent high pressure in pipe 40 from being communicated to the pipe 35.

The method of control of this invention and the apparatus of the specific embodiment shown ensure quick and safe operation of the flow control means under normal conditions and in emergency. Dependence on the personal skill and experience of the operator is eliminated altogether and this result is accomplished with an improvement in result over the best operation heretofore attainable.

I claim:—

1. In a system for controlling the flow of a fluid the combination with a conduit casing having a contracting portion forming a valve seat of a valve plunger having a tapered end forming an annular fluid way with said casing, means for moving said plunger comprising manually controlled valve means, and means for automatically actuating said valve means to vary the rate of movement of said valve plunger.

2. In a system for controlling the flow of a fluid the combination with a conduit casing having a contracting portion forming a valve seat, of a valve plunger having a tapered end forming an annular fluid way with said casing, means for moving said plunger comprising manually controlled valve means, and means for automatically actuating said valve means to vary the rate of movement of said valve plunger according to the condition of the fluid in said conduit.

3. In a system for controlling the flow of a fluid the combination with a conduit, of a valve therefor, means causing the movement of said valve, governing means therefor, and means variably regulating said governing means automatically upon occurrence of predetermined conditions to vary the rate of opening and closing said valve.

4. In a system for controlling the flow of a fluid the combination with a conduit, of a valve therefor, means causing the movement of said valve, governing means therefor, and means regulating said governing means to vary the rate of opening or closing said valve by the condition of the fluid in said conduit.

5. In a system for controlling the flow of a fluid the combination with a conduit casing having a contracting portion forming a valve seat, of a valve plunger having a tapered end forming an annular fluid way with said casing, means for moving said plunger comprising manually controlled valve means, and means for automatically actuating said valve means to vary the rate of both opening and closing of said valve plunger.

6. In a system for controlling the flow of a fluid the combination with a conduit casing having a contracting portion forming a valve seat, of a valve plunger having a tapered end forming an annular fluid way with said casing, means for moving said plunger comprising manually controlled valve means, means for automatically actuating said valve means to vary the rate of movement of said valve plunger, and means for automatically bringing said last named means into operation upon the occurrence of an abnormal condition in apparatus connected with said conduit.

7. In a system for controlling the flow of a fluid the combination with a conduit casing having a contracting portion forming a valve seat, of a valve plunger having a tapered end forming an annular fluid way with said casing, means for moving said plunger comprising manually controlled valve means, and means for automatically actuating said valve means to vary the rate of closing movement of said valve plunger.

8. In a system for controlling the flow of a fluid the combination with a conduit casing having a contracting portion forming a valve seat, of a valve plunger having a tapered end forming an annular fluid way with said casing, means for moving said plunger comprising manually controlled valve means, and means for automatically actuating said valve means to relatively retard a portion of the closing movement of said valve plunger.

9. In a system for controlling the flow of a fluid the combination with a conduit casing having a contracting portion forming a valve seat, of a valve plunger having a tapered end forming an annular fluid way with said casing, means for moving said plunger comprising manually controlled valve means, and means for automatically actuating said valve means to vary the rate of opening movement of said valve plunger.

10. In a system for controlling the flow of a fluid the combination with a conduit casing having a contracting portion forming a valve seat, of a valve plunger having a tapered end forming an annular fluid way with said casing, means for moving said plunger comprising manually controlled valve means, and means for automatically actuating said valve means to relatively retard a portion of the opening movement of said valve plunger.

11. The combination with a valve controlling the flow through a conduit, of means for operating said valve comprising means for retarding the closing movement of the valve by an increase in the relative velocity of flow through only a portion of said conduit, said retarding means having an element which automatically has movement and is rendered operative during said opening movement.

12. The combination with a valve controlling the flow through a conduit, of means for operating said valve comprising means for retarding the opening and the closing movements of the valve by an increase in the relative velocity of flow through a portion of said conduit.

13. The combination with a valve controlling the flow through a conduit, of means for operating said valve comprising means for retarding the closing movement of the valve by a decrease in the fluid pressure at a portion of said conduit adjacent the valve seat, said conduit having provision whereby said pressure decrease is created by a change in flow velocity while permitting differential pressures simultaneously to exist in the same side of the conduit.

14. The combination with a valve controlling the flow through a conduit, of means for operating said valve comprising means for retarding the opening and closing movements of the valve by an increase in the relative velocity of the flow through a portion of said conduit adjacent the valve seat, whereby differential pressures are adapted simultaneously to exist in the same side of the conduit.

15. The combination with a valve for controlling flow through a conduit, the flow being under pressure above atmosphere, of means for operating said valve comprising means for retarding the opening movement of the valve by a relative decrease in the fluid pressure at a portion of said conduit near the seat of said valve, said retarding means having an element which automatically has movement and is rendered operative during said opening movement.

16. The combination with a valve controlling the flow through a conduit, of means for operating said valve comprising means for retarding the opening and the closing movements of the valve by a relative decrease in the fluid pressure at a portion of said conduit on the upstream side of said seat.

17. In a system for controlling the flow of fluid through a conduit the combination with a conduit having a wall with an enlarged portion and contracted end, of a hollow body in said conduit, a valve member sliding across the annular space between said conduit wall and said hollow body and comprising a piston portion between fluid pressure chambers, operating means for controlling the fluid pressure in said chambers to move said valve, said system comprising means for automatically regulating said operating means by the movement of the valve member so as to vary the rate of movement of said member on the occurrence of predetermined conditions.

18. In a system for controlling the flow of fluid through a conduit the combination with a conduit having a wall with an enlarged portion and contracted end, of a hollow body in said conduit, a valve member sliding across the annular space between said conduit wall and said hollow body and comprising a piston portion between fluid pressure chambers, operating means for controlling the fluid pressure in said chambers to move said valve, said system comprising means for automatically regulating said operating means by the movement of the valve member so as to arrest the rate of movement of said member on occurrence of predetermined conditions.

19. In a system for controlling the flow of fluid through a conduit the combination with a conduit having a wall with an enlarged portion and contracted end, of a hollow body in said conduit, a valve member sliding across the annular space between said conduit wall and said hollow body and comprising a piston portion between fluid pressure chambers, operating means for controlling the fluid pressure in said chambers to move said valve, said system comprising means for automatically actuating said operating means upon occurrence of abnormal conditions at a portion of said conduit and regulating said operating means by the movement of the valve member so as to vary the rate of movement of said member on occurrence of predetermined conditions.

20. In a system for controlling the flow of fluid through a conduit the combination with a conduit having a wall with an enlarged portion and contracted end, of a hollow body in said conduit, a valve member sliding across the annular space between said conduit wall and said hollow body and comprising a piston portion between fluid pressure chambers, operating means for controlling the fluid pressure in said chambers to move said valve, said system comprising adjustable means for automatically actuating said operating means upon occurrence of abnormal conditions at a portion of said conduit and regulating said operating means by the movement of the valve member so as to vary the rate of movement of said member on occurrence of predetermined conditions.

21. In a system for controlling the flow of fluid through a conduit, the combination with a conduit having a wall with an enlarged portion and contracted end, of a hollow body in said conduit, a valve member sliding across the annular space between said conduit wall and said hollow body and comprising a piston portion between fluid pressure chambers, valves connected to said chambers to control the fluid pressure therein, fluid pressure means for moving said valves comprising auxiliary pressure chambers, and means for controlling the supply of pressure to said auxiliary chambers comprising a connection to said conduit to vary said supply according to the pressure of the fluid at a point in said conduit.

22. In a system for controlling the flow of fluid through a conduit the combination with a conduit having a wall with an enlarged portion and contracting end, of a hollow body in said conduit, a valve member sliding across the annular space between said conduit wall and said hollow body and comprising a piston portion between fluid pressure chambers, valves connected to said chambers to control the fluid pressure therein, fluid pressure means for moving said valves comprising auxiliary pressure chambers, and means for controlling the supply of pressure to said auxiliary chambers comprising a connection to said conduit adapted to automatically admit pressure to cause said valves to close said valve member upon the occurrence of a predetermined abnormal condition in said conduit.

23. In a system for controlling the flow of fluid through a conduit the combination with a valve for said conduit, of a control valve for controlling said first named valve, an auxiliary valve actuated by said control valve, and means for regulating the rate of opening and closing said conduit valve by varying the flow through said auxiliary valve.

24. In a system for controlling the flow through a conduit, the combination with a valve for the conduit, of a control means for actuating the opening and closing of said valve, a plurality of auxiliary valves governed by said control means and controlling the movement of said conduit valve, and regulating means automatically governing the action of said auxiliary valves to produce a properly variable movement of said conduit valve.

25. In a system for controlling the flow through a conduit the combination with a valve for the conduit, of control means for actuating the opening and closing of said valve, fluid pressure operating means for said valve comprising a plurality of auxiliary valves governed by said control means and controlling the fluid pressure to cause the movement of said conduit valve, and regulating means automatically governing the action of said auxiliary valves to produce a properly variable movement of the conduit valve.

26. The combination with a valve controlling the flow through a conduit, of operating means therefor comprising a valve moved by the pressure of fluid from said conduit, and automatic regulating means for controlling said pressure comprising a connecting passage to said conduit adjacent said valve, and means operative on the occurrence of an abnormal condition in a portion of said conduit to automatically actuate said operating and regulating means.

27. The combination with a fluid conduit having a control valve operable in a cylinder therein, of means for operating said valve by the fluid pressure in said conduit, and means for automatically regulating the supply of fluid pressure to said operating means according to the velocity of the flow adjacent the valve seat to retard the movement of the valve when near its seat without retarding the remainder of the valve stroke.

28. The combination with a fluid conduit having a control valve operable in a cylinder therein, of means for operating said valve by the fluid pressure in said conduit, and means for automatically regulating the supply of fluid pressure to said operating means according to the velocity of the flow adjacent the valve seat to retard the movement of the valve when near its seat without retarding the remainder of the valve stroke comprising a passage subjected to the fluid pressure in said conduit.

29. The combination with a fluid conduit having a control valve operable in a cylinder therein, of means for operating said valve by the fluid pressure in said conduit, and means for automatically regulating the supply of fluid pressure to said operating means according to the velocity of the flow adjacent the valve seat to retard the movement of the valve when near its seat without retarding the remainder of the valve stroke comprising a passage subjected to the fluid pressure in said conduit near the said valve seat.

30. The combination with a three way control valve, of auxiliary fluid regulating valves controlled thereby, a fluid conduit having a fluid control means operated by said valves, and a connection between said valves and said conduit automatically modifying the action of said valves to prevent excessive rise of pressure in said conduit.

31. A system for controlling the flow of a fluid comprising a conduit having an enlarged portion, a cylinder therein and a valve operated by the fluid pressure in said cylinder, means for supplying said cylinder with fluid pressure from said conduit, and means for regulating said supply means to automatically retard the movement of the valve when near its seat without retarding the remainder of the valve stroke.

32. In a system for controlling the flow of a fluid the combination with a conduit having a contracting portion, of a hollow body in said conduit, a valve slidingly supported with relation to said hollow body to close said conduit, fluid pressure operated means for moving said valve and connecting means supplying fluid to said operating means, and means for automatically controlling said connecting means and varying the supply of fluid pressure to said operating means to vary the movement of the valve on occurrence of predetermined conditions.

33. In a system for controlling the flow of a fluid the combination with a conduit having a contracting portion, of a hollow body in said conduit, a valve slidingly supported with relation to said hollow body to close said conduit, fluid pressure operated means for moving said valve and connecting means supplying fluid to said operating means, and means for automatically controlling said connecting means and varying the supply of fluid pressure to said operating means to arrest the movement of the valve on occurrence of predetermined conditions.

34. In a system for controlling the flow of a fluid the combination with a conduit having a contracting portion, of a hollow body in said conduit, a valve slidingly supported with relation to said hollow body to close said conduit, fluid pressure operated means for moving said valve and connecting means supplying fluid to said operating means, and means for automatically controlling said connecting means and varying the supply of fluid pressure to said operating means to vary the movement of the valve on the occurrence of predetermined conditions of the flow in said conduit.

35. In a system for controlling the flow of a fluid the combination with a conduit having a contracting portion, of a hollow body in said conduit, a valve slidingly supported with relation to said hollow body to close said conduit, fluid pressure operated means for moving said valve and connecting means supplying fluid to said operating means, and adjustable means for automatically controlling said connecting means and varying the supply of fluid pressure to said operating means to vary the movement of the valve on the occurrence of predetermined conditions.

36. In a system for controlling the flow of fluid the combination with a conduit having a contracting portion, of a hollow body in said conduit, a valve slidingly supported with relation to said hollow body to close said conduit, fluid pressure means for moving said valve, and automatic control means for said fluid pressure means adapted to retard the opening movement of the valve and hold it from further opening until the pressure in a portion of the conduit reaches a predetermined amount.

37. In a system for controlling the flow of fluid the combination with a conduit having a contracting portion, of a hollow body in said conduit, a valve slidingly supported with relation to said hollow body to close said conduit, fluid pressure means for moving said valve, and automatic control means for said fluid pressure means adapted to retard the opening movement of the valve and hold it from further opening until the pressure in a portion of the conduit reaches a predetermined amount and to then accelerate the opening movement.

38. In a system for controlling the flow of fluid the combination with a conduit having a contracting portion, of a hollow body in said conduit, a valve slidingly supported with relation to said hollow body to close said conduit, fluid pressure means for moving said valve, and automatic control means for said fluid pressure means adapted to first arrest and then accelerate the opening movement of the valve according to the decrease in the velocity of flow in a portion of the conduit.

39. In combination with a conduit having a pressure operated main valve, of control mechanism for said valve including a control valve which is normally operated by manual control to move the main valve in either direction at a variable rate, and means whereby said control valve is automatically operated when a predetermined drop in pressure occurs beyond the main valve.

40. In combination with a conduit having a hydraulic valve and a pair of chambers in which differences of pressure are adapted to be created to cause said valve to be closed and opened, of a control mechanism for said valve including a valve body with connections to both chambers for exhausting pressure therefrom, and with a connection to a source of supply of pressure, a valve unit by which pressure is exhausted from one chamber and simultaneously supplied to the other, means whereby said valve unit may be controlled manually, and means whereby it may be operated automatically when a predetermined drop in pressure occurs beyond the valve.

41. In combination with a conduit having a main valve and a pair of chambers in which differences of pressure are adapted to be created to cause the opening and closing of the valve, control mechanism for controlling the pressures in said chambers and including automatic means for permitting the pressure to build up to a predetermined point beyond the main valve before a full opening of the main valve is permitted.

42. In combination with a conduit having a main valve and a pair of chambers in which differences of pressure are adapted to be created to cause the opening and closing of the valve, control mechanism for controlling the pressures in said chambers and including automatic means for permitting the pressure to build up to a predetermined point beyond the main valve before a full opening of the main valve is permitted and preventing an excessive rise in pressure during the closing movement of the valve by regulating said closing movement according to the velocity of the flow between the valve and its seat.

43. In combination with a conduit having a hydraulic valve and a pair of chambers in which differences of pressure are adapted to be created to cause said valve to be closed and opened, of a control mechanism for said valve including a valve means with connections to both chambers for exhausting pressure therefrom, and with a connection to a source of supply of pressure, a valve unit by which pressure is exhausted from one chamber and supplied to the other, means whereby the valve unit may be operated to open or close the valve, and means whereby the opening movement of the hydraulic valve is checked until pressure is built up to a predetermined point beyond the valve.

44. In combination with a conduit having a hydraulic valve and a pair of chambers in which differences of pressure are adapted to be created to cause the valve to be closed and opened, of a control mechanism for said valve including a valve means with connections to both chambers for exhausting pressure therefrom, and with a connection to a source of supply of pressure, a valve unit by which pressure is exhausted from one chamber and supplied to the other, means whereby the valve unit may be operated to open or close the valve, and means whereby the valve unit is restored to normal position prior to the seating of the valve when the latter is being moved to closed position.

45. In combination with a conduit having a pressure operated main valve and means for operating said valve comprising a pair of chambers in which differences of pressure are adapted to be created to open and close the valve and control mechanism for causing pressure to be supplied to either chamber and exhausted from the other, said control mechanism including means acting automatically on the control mechanism to cause the valve to be cushioned as it comes up to its seat while being closed.

46. In combination with a conduit for liquids having a valve therein, means for opening and closing the valve and means operating automatically to temporarily stop the valve in a partially open position until the conduit beyond the valve is substantially filled with liquid.

47. In combination with a conduit having a valve therein, means for opening and closing the valve, means for automatically checking the opening movement of the valve, and means controlled by the fluid in said conduit beyond the valve for rendering said checking means inoperative.

48. In combination with a conduit for liquids, a valve therein, pressure operated means for opening and closing the valve, and means acting automatically during the opening movement of the valve for controlling the pressure acting on the valve to temporarily check the opening movement thereof until the conduit beyond the valve is substantially filled with liquid, said means being adjustable to vary the position at which the valve is checked in its opening movement.

49. In combination with a conduit having a pressure operated main valve and means for operating said valve comprising a pair of chambers in which differences of pressure are adapted to be created to open and close the valve and control mechanism for causing pressure to be supplied to either chamber and exhausted from the other, said control mechanism including means rendered operative near the extreme end of the stroke and acting automatically to check the exhaust from one of said chambers to cushion the final closing movement of the valve.

50. In combination with a conduit for liquid having a valve therein, pressure operated means for opening and closing the valve, and means acting automatically during the opening movement of the valve for controlling the pressure acting on the valve to temporarily check the opening movement thereof until the conduit beyond the valve is substantially filled with liquid.

51. A system for controlling fluid flow through a conduit comprising a conduit valve having opening and closing fluid pressure chambers, and means for controlling the fluid for said chambers, including a supply passage from said conduit to said closing chamber, a valve for controlling supply of fluid to said closing chamber, a valve for controlling exhaust fluid from said closing chamber, each of said control valves having a cylinder and piston for controlling operation thereof, and a pipe connection between each of said cylinders and a point in the conduit which is adapted to have a region of low pressure when the conduit valve approaches its seat, and whereby when a region of low pressure is created in said conduit said supply control valve is closed and the exhaust control valve is opened automatically.

52. The combination as set forth in claim 51 having an exhaust passage leading from said opening chamber, an exhaust control valve disposed therein, a cylinder having a piston therein for controlling said opening-chamber exhaust valve, and means for automatically closing said latter exhaust valve when the supply to said closing chamber is automatically restricted.

53. The combination as set forth in claim 51 having an exhaust passage leading from said opening-chamber, an exhaust control valve disposed therein, a cylinder having a piston therein for controlling said opening-chamber exhaust valve and means for automatically closing said latter exhaust valve when the supply to said closing chamber is automatically restricted, said latter means including the pipe connection between the cylinders for controlling respectively the fluid supply control valve and the exhaust control valve for the opening chamber.

54. The combination as set forth in claim 51 having an exhaust passage leading from said opening chamber, an exhaust control valve disposed therein, a cylinder having a piston therein for controlling said opening-chamber exhaust valve, and means for automatically closing said latter exhaust valve when the supply to said closing chamber is automatically restricted, said latter means including the pipe connection between the cylinders for controlling respectively the fluid supply control valve and the exhaust control valve for the opening chamber, said latter pipe connection also including a pipe with a low pressure point in the downstream side of said conduit.

55. A system for controlling fluid flow through a conduit comprising in combination a conduit valve having opening and closing fluid chambers, a passage leading from the upstream side of said conduit to said closing chamber, a valve for controlling the supply of fluid to said closing chamber, a valve for controlling the exhaust of fluid therefrom, each of said control valves having associated therewith a cylinder and a piston, each of said cylinders having one of their ends in communication with the supply conduit and also in communication with a point in the conduit adjacent to and on the upstream side of the seat of the conduit valve, said opening chamber having an exhaust passage, a control valve therein also having associated therewith a cylinder and piston, one end of said latter cylinder having communication with the other end of the cylinder which is associated with the supply control valve, a valve for initiating opening or closing of the conduit valve, and fluid connections between said initiating valve and the other end of said cylinder which is associated with the exhaust control valve for the closing chamber, and said initiating control valve also having fluid connection with said pipe connection which is between the cylinder associated with the opening chamber exhaust valve and the cylinder associated with the supply control valve.

56. The combination as set forth in claim 55 having the various control valves of the type having inner and outer casings spaced to form a relatively smooth annular fluid passageway and a plunger slidingly connected with the inner casing to form an internal fluid pressure chamber.

57. The combination as set forth in claim 55 having the various control valves of the type having inner and outer casings spaced to form a relatively smooth annular fluid passageway and a plunger slidingly connected with the inner casing to form an internal fluid pressure chamber, said plungers having openings therein to allow communication between the internal chambers in the downstream side thereof, and a pilot valve for controlling each of said openings, each pilot valve being controlled by the piston and cylinder respectively associated therewith.

CHESTER W. LARNER.